United States Patent

[11] 3,632,879

[72] Inventor Raymond Freisinger Franklin Lakes, N.J.
[21] Appl. No. 47,210
[22] Filed June 18, 1970
[45] Patented Jan. 4, 1972
[73] Assignee National Alarm Products Co., Inc. Farmingdale, N.Y.

[54] AUTOMATIC TELEPHONE DIALER FOR EMERGENCY MESSAGES
8 Claims, 4 Drawing Figs.

[52] U.S. Cl. .......... 179/5 P
[51] Int. Cl. .......... H04m11/04
[50] Field of Search .......... 179/5 P

[56] References Cited

UNITED STATES PATENTS 3,482,045 12/1969 Chase .......... 179/5 P
3,553,377 1/1971 Jones .......... 179/5 P

*Primary Examiner*—Kathleen H. Claffy
*Assistant Examiner*—David L. Stewart
*Attorney*—Leonard H. King

ABSTRACT: Apparatus for automatically dialing a public telephone line and transmitting an emergency message has two pickup heads for selectively picking up prerecorded emergency messages from two channels of an endless magnetic tape in a tape cartridge. Two relays are connected in circuit with the pickup heads. Fire detecting sensors are connected to one relay and burglary detecting sensors are connected to the other relay. Activation of a burglary sensor starts a tape drive motor and causes pickup of a burglary notification message from one channel. Activation of a fire sensor cuts out the burglary message and transmits the fire message which has priority. A solenoid is actuated when a sensor is activated to move the tape cartridge and press the tape against the pickup heads. The tape is automatically stopped when transmission of a message is completed unless a sensor is actuated, whereupon the apparatus starts another cycle of transmission.

INVENTOR.
BY RAYMOND FREISINGER
Polachek & Saulsbury
ATTORNEYS

INVENTOR
RAYMOND FREISINGER
BY
Polachek & Saulsbury
ATTORNEYS

AUTOMATIC TELEPHONE DIALER FOR EMERGENCY MESSAGES

This invention concerns an improved automatic telephone dialing system.

Prior telephone-dialing systems used for emergency messages have heretofore been known. In such systems, messages recorded on separate tracks of a magnetic tape are picked up in response to activation of sensing devices and are selectively fed to a telephone line. The system includes apparatus which responds to recorded telephone dial pulses on the tape to dial an emergency number such as that of a police or fire department. Typical systems of this type are described in U.S. Pat. Nos. 2,445,599 and 2,407,269. When an emergency such as the breaking in of a building occurs, the emergency situation apparatus automatically transmits a prerecorded message concerning a burglary on one tape track or channel to the police department. If a fire breaks out, the apparatus automatically transmits a prerecorded message about a fire on another tape channel to the fire department. Sometimes a fire breaks out after a building is entered by an authorized person. This creates a situation where the fire hazard is greater than that induced by the unauthorized entrance of the building. However, the sequence of operations of the automatic-dialing system is such that the message about the burglary is continuously transmitted to the police department and the message about the fire does not get through.

The present invention solves this problem by a circuit arrangement wherein the telephone line connected to the police department is seized by the fire message transmission channel; the burglary message is cut off, and the message concerning the fire is transmitted. In addition, the apparatus will automatically stop transmitting after the fire message is completed; then it will dial the number of the fire department and will retransmit the fire message, or it will transmit the burglary message if the fire is out. The system is programmed so that the fire message has priority and the fire transmission channel will seize the telephone line at any time before or after transmission starts from the burglary message channel.

The apparatus employs a tape cartridge of standard type having an endless tape on which the burglary and fire messages are prerecorded in separate channels. In prior automatic telephone dialing apparatus using such tape cartridges, the magnetic tape was maintained in continuous contact with the magnetic pickup heads. This was found to be undesirable since prerecorded telephone dialing codes could be picked up from both channels simultaneously to result in improper dialing. Also, the magnetic tape was engaged continuously between a capstan and rubber idler roller which caused strain in the parts, distortion of the idler roller, and distortion of the parts of the tape drive mechanism. The present system overcomes this situation by keeping the tape cartridge in a retracted inactive position until such time as occurrence of an emergency condition actuates the tape drive system. Then the cartridge is advanced to tape drive position. The tape is then spring pressed against the magnetic pickup heads, and the idler roller and capstan engage the tape therebetween.

Other and further features, objects and advantages of the invention will become apparent from the following detailed description taken together with the drawings, wherein.

Figures 1, 2:
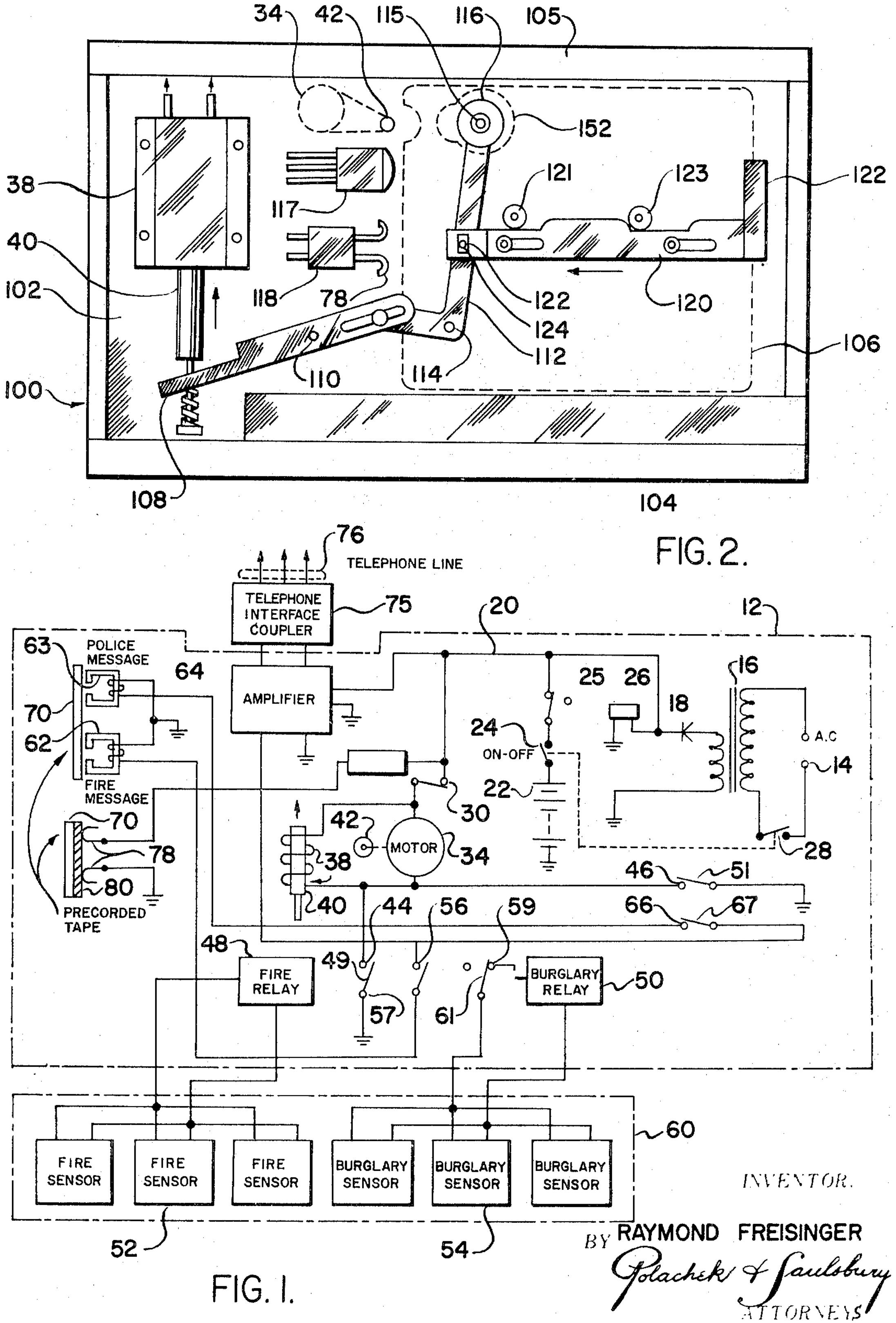
FIG. 1 is a diagram of the basic electric circuitry of the system embodying the invention.
FIG. 2 is a top plan view of parts of the apparatus without the tape cartridge.

Referring to FIG. 1, there is shown diagrammatically a system 10 including the automatic telephone-dialing apparatus 12 embodying the invention. The apparatus 12 has terminals 14 to which a suitable alternating current power supply can be connected. A transformer 16 and rectifier 18 are connected to the power supply terminals for producing low-voltage direct current on line 20. A local battery power supply 22 is also provided. This is connected via switch 24 and normally closed contacts 25 of relay 26 to line 20. The coil of relay 26 is connected to rectifier 18. Switch 28 is connected in series with the primary of transformer 16. Switch 28 is connected in series with the primary of transformer 16. Switches 24 and 28 are manually operated and ganged together for applying power to apparatus 12. If the alternating power supply should fail, relay 26 will be deenergized and open contacts 25 will close. This will automatically switch the battery power supply 22 to line 20 for continuing the power supply of the apparatus.

Line 20 is connected via normally closed contacts 30 of relay 32 to both motor 34 and solenoid 38. Solenoid 38 has a tape cartridge advancing plunger 40. Motor 34 drives capstan 42 of a magnetic-tape driven mechanism. Both motor 34 and solenoid 38 are connected to fixed normally open contacts 44, 46 of relays 48, 50. Normally open poles 49, 51 of these relays are grounded. Relay 48 is designated the fire relay and is connected to fire sensors 52 distributed in different locations in a building 60 to be protected by the system. Burglary relay 50 is connected to burglary sensors 54 located at doors and windows of the building to sense an unauthorized entry of the building.

Figure 4:
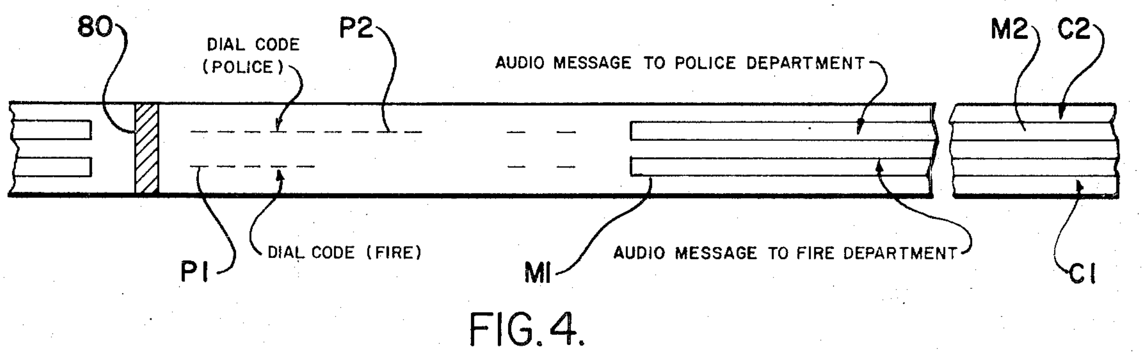
FIG. 4 is a diagrammatic fragmentary representation of the prerecorded magnetic tape used in the system.

Contacts 56, 57 of relay 48 are connected between magnetic read-in or pickup head 62 and a transistorized amplifier 64 energized via line 20. Normally closed contacts 59, 61 of relay 48 are connected in series with the coil of relay 50 so that the relay 50 is deenergized when relay 48 is energized. Normally open contacts 66, 67 of relay 50 are connected between the input of amplifier 64 and magnetic head 63. Pickup head 62 will read a message concerning a fire from one channel of magnetic tape 70 into amplifier 64. Pickup head 63 will read a message concerning a burglary or unlawful entry of the building from another channel of tape 70 into amplifier 64. The two channels C1 and C2 on which messages M1 and M2 are prerecorded on tape 70 are indicated in FIG. 4. The output of amplifier 64 is connected via a suitable telephone interface coupling device 75 to public telephone line 76.

Figure 3:
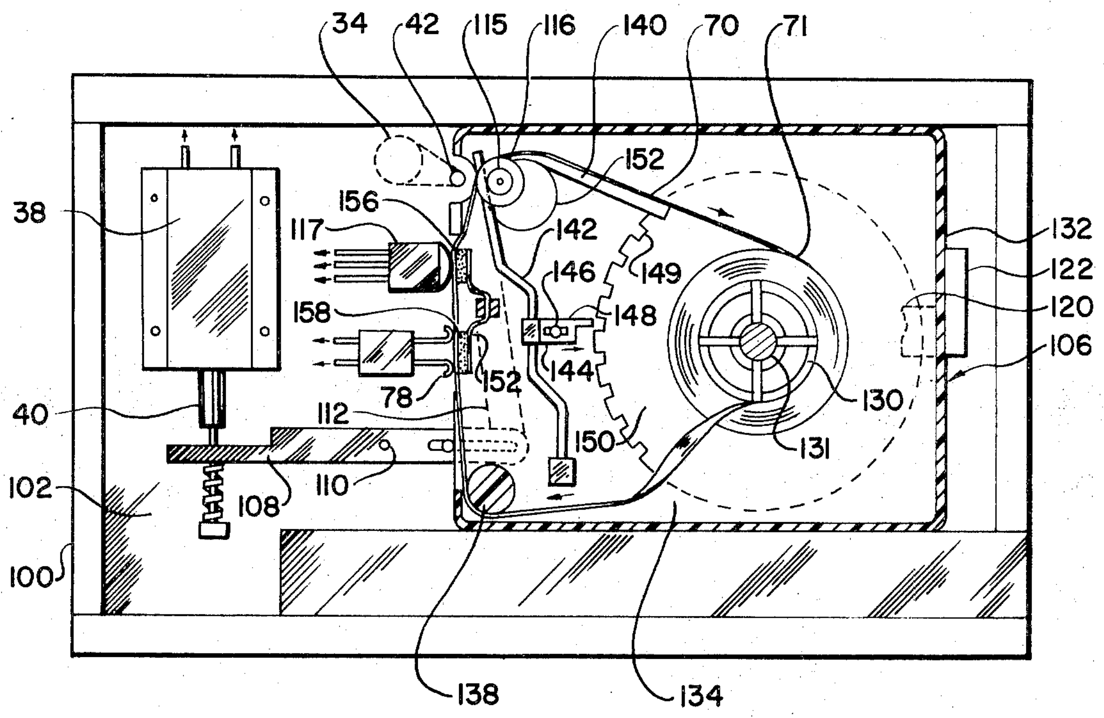
FIG. 3 is a top plan view of the same parts of the apparatus as in FIG. 2, but with tape cartridge in place and advanced to operating position.

The apparatus further includes a pair of stationary wiper contacts 78 disposed for sensing a conductive stripe 80 on tape 70. These contacts are connected in series with the coil of a relay 32 whose contacts 30 are connected in series with the solenoid coil 36 and motor 34 as above mentioned. FIGS. 2 and 3 show plan views of parts of apparatus 12. This apparatus includes a cabinet or housing 100 having an upper stationary plate 102 formed with lateral guides 104, 105 between which tape cartridge 106 is longitudinally slidable. Solenoid 38 is mounted on plate 102. Plunger 40 extends out of the solenoid and pivotally engages a lever 108 pivoted on a pin 100. Lever 108 pivotally engages a crank lever 112 pivoted on a pin 114. Lever 112 carries a shaft 115 on which an idler roller 116 is freely rotatably and is normally spaced from capstan 42 driven by motor 34. Pickup heads 62, 63 are mounted in the same head assembly 117 on plate 102. Insulated block 118 supporting contacts 78 is disposed laterally of head assembly 117. A longitudinally slidable arm 120 is mounted on plate 102. One end of arm 120 has a hole 122 in which is engaged a pin 124 on lever 112. The other end of arm 120 carries an abutment 122 which bears against the right end of tape cartridge 106. The arm moves along guides 121, 123.

The tape cartridge 106 includes a reel 103 shown in FIG. 3 rotating on a spindle 131 in casing 132 on base plate 134. Endless tape 70 is wound in a roll 71 on reel 130 and is threaded around guides 138, 140 at left end corners or casing 132. Openings are provided in the left end of casing 132 for exposing the tape to capstan 42, head assembly 117 and fixed contacts 78. A wire spring 142 is mounted on the baseplate 134. This spring has a free end bearing against shaft 115 carrying roller 116. A clip 144 is engaged on spring 142 and is slidably held by a pin 146 on baseplate 134. This clip has a finger 148 engageable in one of peripheral notches 149 of disk 150 which forms the bottom of reel 130. Shaft 115 extends through a hold 152 in the baseplate 134 and holds roller 116 inside the tape cartridge at the inner side of tape 70 opposite capstan 42. A V-shaped leaf spring 152 is apically engaged in a stationary post 154 on plate 134 and carries felt pads 156, 158 which bear against the inner side of tape 70 at head assembly 117 and contacts 78. This spring is tensioned when the tape cartridge is advanced to he left against head assembly 117. When leftward pressure on the tape cartridge exerted by abutment 122 is relieved, the free ends of spring 152 move to the left to retract the tape cartridge to the right.

In operation of the apparatus and system shown in FIGS. 1–4, the apparatus 12 is turned on by manually closing switches 24, 28. Power will be applied from an alternating current source via terminals 14. If this power source fails or is lacking, battery power supply 22 takes over the by operation of relay 26. Amplifier 64 becomes energized and is alert awaiting pickup of dialing pulses P1 or P2, indicated in FIG. 4, which pulses will be applied to the telephone interface coupler 75 for dialing the number of a fire or police department. Suppose now that one of the burglary sensors 54 is activated upon the unauthorized opening of a door or window to building 60. Relay 50 will be energized and both solenoid 38 and motor 34 will become energized. Solenoid 38 will retract plunger 40 which will cause lever 112 to pivot counterclockwise as viewed in FIG. 2. This will cause arm 120 to move to the right. Abutment 122 will engage the right end of tape cartridge 106 and will move it to the left so that tape 70 is firmly engaged between the tape head assembly 117 and felt pad 156. At the same time lever 112 moves roller 116 to the right so that the tape is engaged between the rubber roller and capstan 42. The capstan will be driven by motor 34. Pickup head 63 is connected to the input of the amplifier through closed contacts 66, 67 of relay 50. First the dialing code pulses P2 will be applied to the line. Then audio burglary message M2 will be transmitted. The prerecorded message will report the address of building 60. It will state that it has been entered unlawfully and that police assistance should be dispatched immediately. The message will be repeated several times until metallic strip 80 arrives at contacts 78. These contacts will be bridged by conductive stripe 80 and relay 32 will become actuated. Contacts 30 will open and the motor 34 will stop. Solenoid 38 will also become deenergized. This will complete a cycle of the apparatus. Tape 70 will move slightly passed stripe 80 due to inertia in motor 34 as it becomes deenergized, and also due to inertia in movement of plunger 40 as the solenoid becomes deenergized. The flexed, rather flattened spring 152 will then assume its normal V-shape and the tape cartridge will move to the right relieving the pressure between pads 156, 158, the tape assembly 117 and contacts 152. By this arrangement positive pressure against the pickup head assembly 117 is assured at all times while a message M1 or M2 or dialing code P1 or P2 is being transmitted from the tape.

Suppose that a fire breaks out in a building 60 while the burglary message M2 is being transmitted. Fire relay 48 will be energized by one of sensors 52. Contacts 44, 49 and 56, 57 will close while contacts 59, 61 will open. This causes relay 50 to become deenergized and pickup of the burglary message M2 from the upper channel C2 will be cut off. Pickup head 62 will become energized and the fire message M1 from channel C1 will be transmitted instead to the telephone line 76 in place of the burglary message. The fire message will state the existence of a fire and will request immediate assistance. When the fire message is completed and strip 80 is reached, the motor 34 and solenoid 38 will become deenergized momentarily, The telephone circuit to the police department will be broken. The apparatus will at once recycle because relay 48 is still energized. The dial code P1 of the fire department will be transmitted and then the fire message will be transmitted to the fire department which answers the call of the apparatus. It will be noted that the fire message channel C1 seizes the telephone line at any time that a fire sensor is activated whether or not a burglary sensor is active. This insures priority to transmission of the fire message at all times. It will also be noted that the apparatus automatically recycles and redials an emergency telephone number and retransmits an emergency message as long as one of the emergency sensors 52 or 54 are activated and switches 24, 28 are turned on.

The apparatus 12 can be made up in very compact form and located in a protected area where it is not subject to tampering by unauthorized persons. As many sensors 52, 54 as desired can be connected to the apparatus. Prerecorded messages on the tape 70 can be changed by use of conventional programming equipment.

I claim:

1. Apparatus for automatically dialing a public telephone line and transmitting an emergency message, comprising first and second magnetic pickup heads disposed to pick up prerecorded emergency messages from respective first and second channels prerecorded on a magnetic tape; first and second channels prerecorded on a magnetic tape; first and second relays connected in circuit with the first and second pickup heads respectively and with respective first and second groups of emergency sensors; and circuit means interconnecting the relays so that activation of a sensor in the first group causes activation of first relay and deactivation of the second relay so that only the message from the first channel is transmitted to said line and a support carrying said pickup heads in a fixed position and arranged for movably supporting a cartridge containing said magnetic tape; a solenoid carried by said support and connected in circuit with said relays; a plunger actuated by the solenoid; and mechanical means operatively connected to said plunger and arranged to move said cartridge on said support when the solenoid is energized for pressing said tape against said pickup heads.

2. Apparatus as defined in claim 1, wherein said channels respectively include dialing codes of telephone numbers of two different emergency agencies, whereby activation of the first relay causes pickup of the dialing code from the first channel and dialing of the number of one agency, whereby activation of the second relay causes pickup of the pickup of the dialing code from the second channel and dialing of the number of a second agency, and whereby activation of the first relay precludes activation of the second relay so that the dialing code from only the first channel can be picked up.

3. Apparatus as defined in claim 1, further comprising a motor connected in circuit with said relays; a capstan driven by said motor for driving the tape; and a roller carried by said mechanical means and arranged for engaging the tape between the capstan and roller when either one of the the relays and said solenoid are energized.

4. Apparatus as defined in claim 1, further comprising a cartridge including a flat, rectangular casing slidably mounted on said support; an endless roll of said magnetic tape engaged on a reel in said casing; and spring means in said casing disposed to press the tape against said pickup heads when the solenoid is energized, whereby said spring means moves the cartridge away from the pickup heads when solenoid is deenergized.

5. Apparatus as defined in claim 4, further comprising a motor connected in circuit with said relays; a capstan driven by said motor for driving the tape; and a roller carried by said mechanical means and movably disposed inside the casing for engaging the tape between the capstan and roller when either one of the relays and said solenoid are energized.

6. Apparatus as defined by claim 5, wherein said channels respectively include dialing codes of telephone numbers of two different emergency agencies, whereby activation of the first relay causes pickup of the dialing code from the first channel and dialing of the number of one agency, whereby activation of the second relay causes pickup of the pickup of the dialing code from the second channel and dialing of the number of a second agency, and whereby activation of the first relay precludes activation of the second relay so that the dialing code from only the first channel can be picked up.

7. Apparatus as defined in claim 6 further comprising a main power supply connected in circuit with said motor and solenoid; a standby other power supply; and relay means interconnecting both power supplies in such a manner as to deactivate the standby power supply when the main power is on and to connect the standby power supply to the motor and solenoid in place of the main power supply if the main power supply becomes deactivated.

8. Apparatus as defined in claim 7, further comprising a pair of spaced stationary wiper contacts carried by said support and disposed for contacting a metal stripe on said tape; and further relay means connected in circuit with said motor, solenoid and power supplies for deenergizing the motor and solenoid when said metal stripe is contacted by the wiper contacts.

* * * * *